US005653191A

United States Patent [19]

Calhoun et al.

[11] Patent Number: 5,653,191

[45] Date of Patent: Aug. 5, 1997

[54] PRESSURE INDICATOR

[76] Inventors: Clifford A. Calhoun; Craig Calhoun, both of 11717 Valley Rd., Fairfax, Va. 22033

[21] Appl. No.: 564,470

[22] Filed: Nov. 29, 1995

Related U.S. Application Data

[62] Division of Ser. No. 203,410, Mar. 1, 1994, Pat. No. 5,488,946.

[51] Int. Cl.[6] ........ G01L 7/16

[52] U.S. Cl. ........ 116/272

[58] Field of Search ........ 116/34, 266, 267, 116/268, 269, 270, 281, 283, DIG. 7, DIG. 25, 272; 137/557

[56] References Cited

U.S. PATENT DOCUMENTS

| | | | |
|---|---|---|---|
| 1,204,013 | 11/1916 | Hanni | 116/272 X |
| 2,427,680 | 9/1947 | Leonard | 116/272 X |
| 2,428,425 | 10/1947 | Levitt . | |
| 3,103,952 | 9/1963 | Whiting | 137/557 |
| 3,203,246 | 8/1965 | Horwitt et al. | 116/272 X |
| 3,425,414 | 2/1969 | Roche . | |
| 3,738,311 | 6/1973 | Appleton | 116/272 |
| 3,800,736 | 4/1974 | Krohn | 116/268 |
| 3,906,950 | 9/1975 | Cocozza . | |
| 3,934,292 | 1/1976 | Mulderrig . | |
| 4,177,828 | 12/1979 | Vache . | |
| 4,423,724 | 1/1984 | Young . | |
| 4,500,014 | 2/1985 | Zimmerly . | |
| 4,560,356 | 12/1985 | Burr . | |
| 4,565,301 | 1/1986 | Hubbard et al. . | |
| 4,694,850 | 9/1987 | Fumino . | |
| 4,887,591 | 12/1989 | Okumura . | |
| 4,963,327 | 10/1990 | Russell . | |
| 5,014,786 | 5/1991 | Kobayashi | 116/272 |
| 5,027,977 | 7/1991 | Kay et al. . | |
| 5,215,217 | 6/1993 | Leslie . | |
| 5,273,185 | 12/1993 | Sacarto . | |
| 5,323,731 | 6/1994 | Kalowski | 116/272 |

OTHER PUBLICATIONS

"EMERG: Emergency Breathing Equipment"; Lalsip, Inc., Colorado Springs Colorado.

*Primary Examiner*—William A. Cuchlinski, Jr.
*Assistant Examiner*—Willie Morris Worth
*Attorney, Agent, or Firm*—David M. Klein; Bryan Cave LLP

[57] ABSTRACT

An air pressure indicator attaches to a manifold and uses air pressure to elide a pressure pin outward. A spring moves the pressure pin inward when pressure decreases in the manifold. A collet and o-ring on the pressure pin prevent the flow of pressurized fluid through the interior of the indicator.

16 Claims, 6 Drawing Sheets

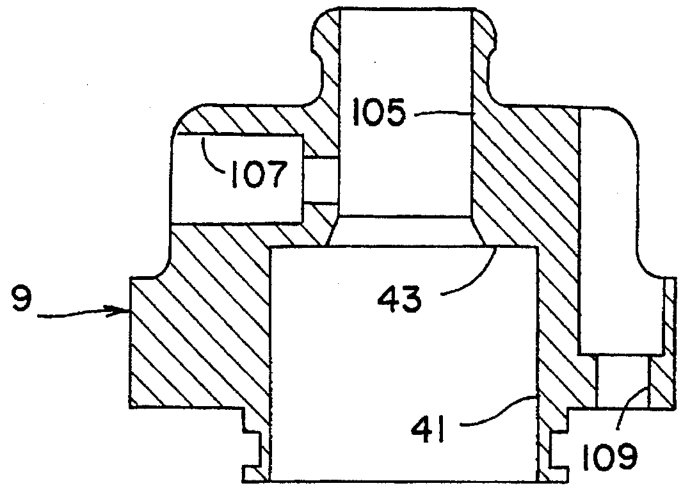
FIG. 6
FIG. 7
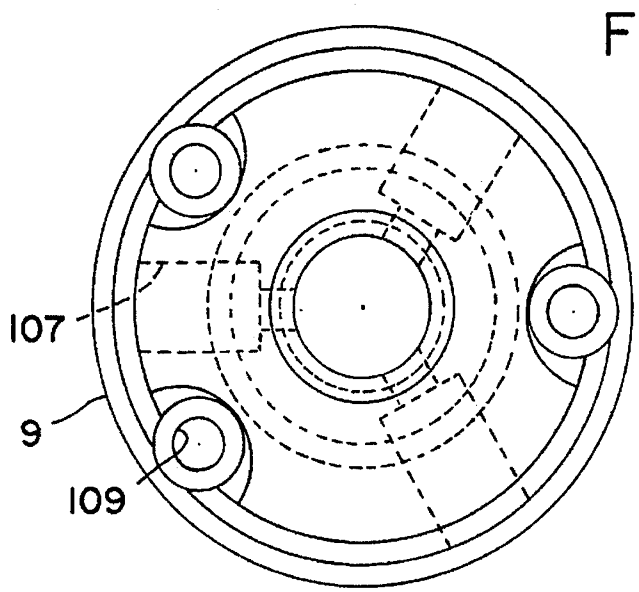
FIG. 8
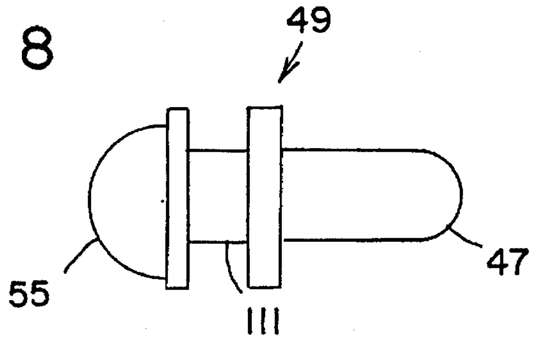

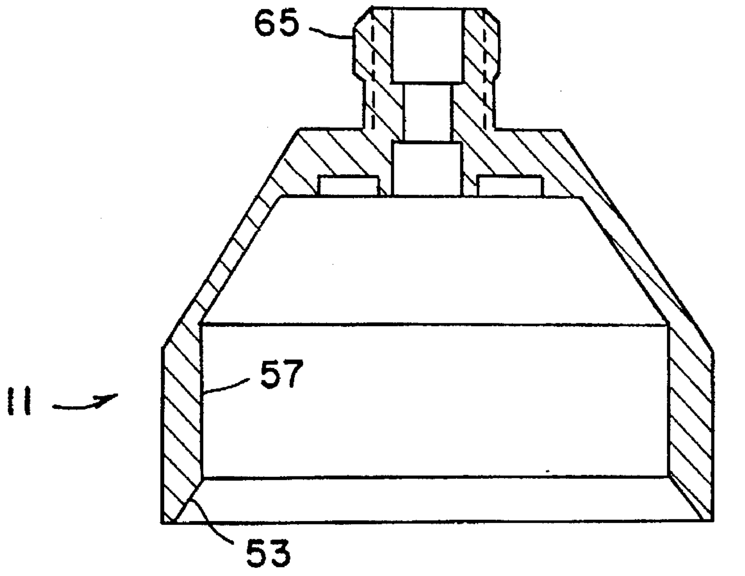
FIG. 9
FIG. 10
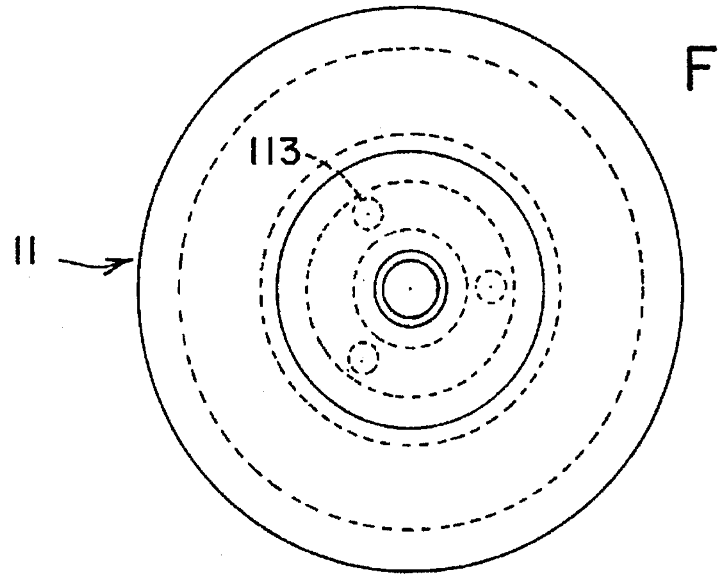
FIG. 11
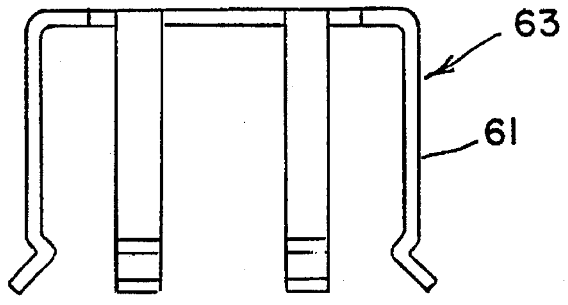

PRESSURE INDICATOR

This is a divisonal of U.S. application Ser. No. 08/203,410, filed Mar. 1, 1994, now U.S. Pat. No. 5,488,946.

BACKGROUND OF THE INVENTION

The invention is related to emergency breathing supplies which pierce high pressure air cartridges to supply air through demand regulators to masks or mouthpieces. The emergency breathing devices are used notably in underwater situations to provide breathable air while exiting a craft, such as a helicopter, an aircraft or a vessel. The emergency breathing devices may be used when exiting a smoke or fume-filled space. The breathing devices are intended to supply six to eight minutes of breathable air from small, high pressure cartridges.

The devices must be capable of being stored for long periods and carried for long periods in rough environments. Predecessor devices used stacked springs and lever-type actuators. The stacked springs provided problems because of long and rough storage before use, and the lever-type actuators permitted repositioning into a false, apparently ready position after use. Prior devices provided no indication that an air supply was about to be exhausted.

A need exists for a highly dependable emergency breathing device which operates reliably after long periods of storage and rough carrying, and which gives immediate indications of readiness. A need exists for devices which provide reliable indications of an impending exhausting of an emergency air supply.

SUMMARY OF THE INVENTION

The present invention provides a new device for opening high pressure air cartridges in emergency breathing devices and for indicating the cocked and ready nature of the devices. The present invention prevents reassembly of the devices into an apparently ready condition by unauthorized persons. The present invention provides an indication of air pressure remaining in the manifold from the compressed air cartridges.

An emergency breathing device has a manifold with two threaded receivers for holding compressed air cartridges and two parallel bores. A first bore holds a primary plunger. A collar on the plunger rests on a nylon seal, which is supported on a ledge between the relatively small lower bore and the larger upper bore. A drive spring surrounds an upper portion of the primary plunger and bears against the collar. A housing receives and abuts the spring, and slides an upper part of the plunger through an axial bore in the housing. Fasteners connect the housing to the manifold. Detent pins extend through radial bores in the housing. Detent springs urge the detent pins outward. The plunger has a recess Which receives semi-spherical inner ends of the detent pins when the plunger is pushed upward against drive spring force. A bell-shaped cap has a bevelled lower edge and a cylindrical inner surface, which presses the detent pins inward against detent spring force. Spring fingers of a cap retainer mounted inside the cap engage a knob on the top of the housing to hold the cap on the housing. A downward-urged indicator pin extends through aligned central holes in the cap and is extended upward into the pull ring by an upper end of the plunger. Pulling sharply on the ring pulls the cap from the housing and releases the detents. The drive spring drives a plunger downward, and a bevelled cutter point on the tapered lower end of the plunger punctures the compressed air cartridge. An air pressure indicator in the side of the manifold slides a pressure indicator pin outward with compressed air in the manifold. A spring moves the pressure indicator pin inward when pressure decreases in the manifold. Compressed air from the first cartridge passes through axial and radial passages in the lower end of the plunger and crosses through a channel to a second bore to drive a piston with a similar bevelled and tapered cutter into a second air cartridge, providing air from both cartridges to a first stage regulator connected to the second bore, and then to a regulated mouthpiece.

An emergency breathing device compressed air release assembly has a manifold with threaded receivers for receiving compressed air cartridges. First and second bores are aligned respectively with the receivers. A primary plunger is fitted within the first bore. A collar extends outward from the plunger and an annular seal on a ledge in the first bore for limiting travel of the collar and plunger. A drive spring is positioned within the first bore and contacts the collar for driving the plunger toward the first bore.

A cutter point on the plunger pierces a seal at the end of the first gas cartridge in the first receiver. A housing overlies the manifold and is aligned with the first bore. The housing holds an upper end of the drive spring and slidably receives an upper end of the plunger. Fasteners connect the housing to an upper end of the manifold.

Detent pins are positioned radially in the housing, and springs are connected between the housing and the detent pins for urging the detent pins outward to inoperative positions. The plunger has a detent pin-receiving recess for aligning with the detent pins upon compression of the plunger drive spring. A cap has an inner surface for contacting outer surfaces of the detent pins and urging the detent pins inward against detent spring forces, for engaging the plunger recess with inner ends of the detent pins. A pull ring is connected to the cap for pulling the cap off the detent pins and for allowing the detent springs to force the detent pins outward, releasing the plunger to allow the plunger to be driven downward by the drive spring into cartridge seal-piercing position.

An upper end of the housing has a retainer knob. A retainer spring is connected to an inside of a cap for engaging the knob on the housing, and for holding the cap on the housing until the cap is intentionally pulled from the housing.

Holes are aligned in the ring and the cap and an indicator pin is positioned in the aligned holes. A spring retainer is connected to a bottom of the indicator pin. An indicator spring is connected between the retainer and the cap for urging the pin downward, with a top of the retainer pin held flush with the ring opening. The indicator pin is pushed upward with a top of the indicator extending from the ring opening when the plunger is in a cocked position, with the detent pins in the plunger recess.

An air pressure indicator mounted on the manifold for communication with air pressure from an air cartridge. The air pressure indicator has a body connected to the manifold. A pressure pin is slidable in the body. A pin has a spring-holding flange, and a spring holder is connected to the body. A load spring is mounted in the body between the flange and holder for compressing as an inner end of the pressure pin is moved by air pressure force for projecting an outer end of the pressure pin out of the indicator body.

Preferably the spring holder is annular and surrounds an outer end of the pressure pin. In a preferred embodiment, a second load spring surrounds the pressure pin and bears against the flange and the spring holder for urging the pressure pin inward. The body has a shoulder between a relatively small bore and a relatively large outer bore for receiving an inner surface of the flange against the shoulder and restricting inward travel of the pressure pin. The spring holder is threaded in an outer threaded opening of the larger bore.

The body has an inward facing counter bore, and has a collet and O-ring in the counter bore for sealing the pin and small bore against flow of pressurized air along the pin and through the body.

The main plunger has an axial gas passage in its lower end and a slanted gas cartridge seal cutter at its lower tip. The lower tip is tapered upwardly and outwardly for supporting the tip and for sealing a puncture in the gas cartridge and directing pressurized air to flow through the axial passage.

An air channel in the manifold and an axial passage in the lower end of the plunger communicate with a radial passage and the plunger, and the radial passage communicates with the gas channel for flowing compressed air from an air cartridge to the air passages and air channel to a second bore. A piston mounted in the second bore has a tapered needle with an axial gas passage and a sharpened bevelled cutting end for penetrating a second air cartridge, and provides air from the first cartridge and the second cartridge to a regulator connected to the manifold.

These and further and other objects and features of the invention are apparent in the disclosure, which includes the above and ongoing written specification, with the claims and the drawings.

BRIEF DESCRIPTION OF THE DRAWINGS

FIG. 6 is a cross-sectional view of the plunger retainer housing.

FIG. 7 is a plan view of the plunger retainer housing shown in FIG. 6.

FIG. 8 is an elevational detail of a plunger detent pin used in the housing shown in FIGS. 6 and 7.

FIG. 9 is a cross-sectional elevational view of the cap.

FIG. 10 is a plan view of the cap shown in FIG. 9.

FIG. 11 is an elevation of the cap retainer spring.

DETAILED DESCRIPTION OF THE DRAWINGS

Figure 1:
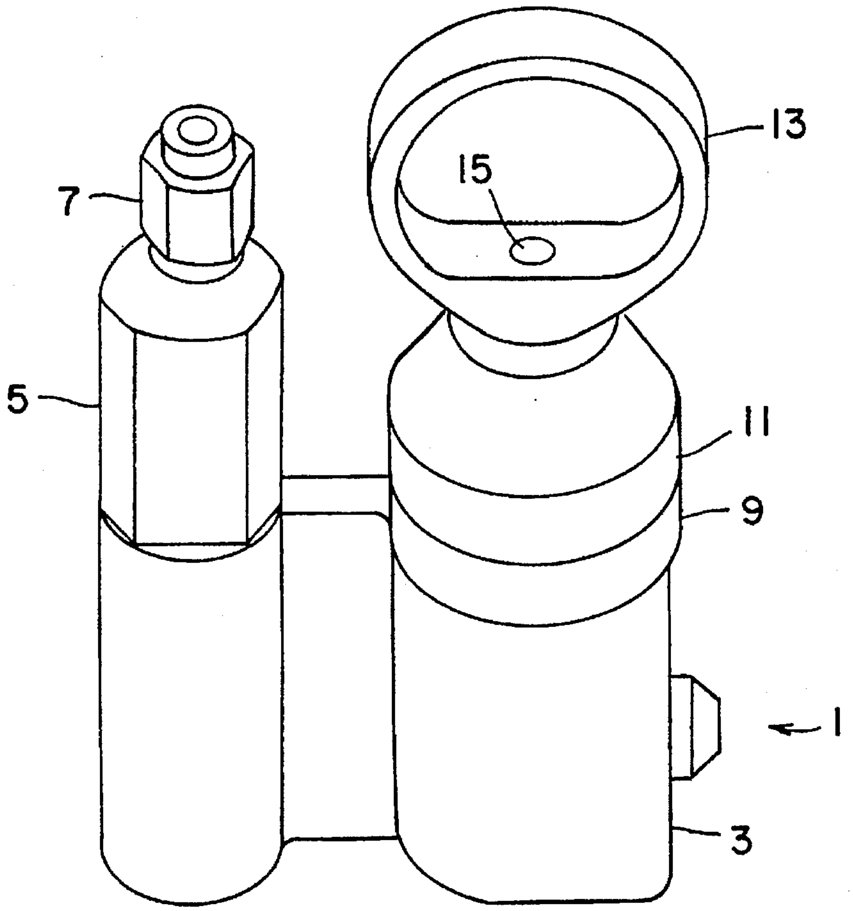
FIG. 1 is an assembled view showing the device ready to receive compressed air cartridges and a breathing tube.

Referring to FIG. 1, an emergency breathing control device is generally indicated by the numeral 1. The device includes a manifold 3 and a regulator 5 with an attachment 7 for a tube leading to a mask or mouthpiece. Compressed air cartridges are connected to the bottom of the manifold 3. A housing 9 is connected to the top of the manifold, and a cap 11 is connected to the top of the housing. A pull ring 13 lifts the cap 9 from the housing 11. An indicator pin 15, shown in its lowered or flush position, is up when a plunger is cocked and ready.

Figure 2:
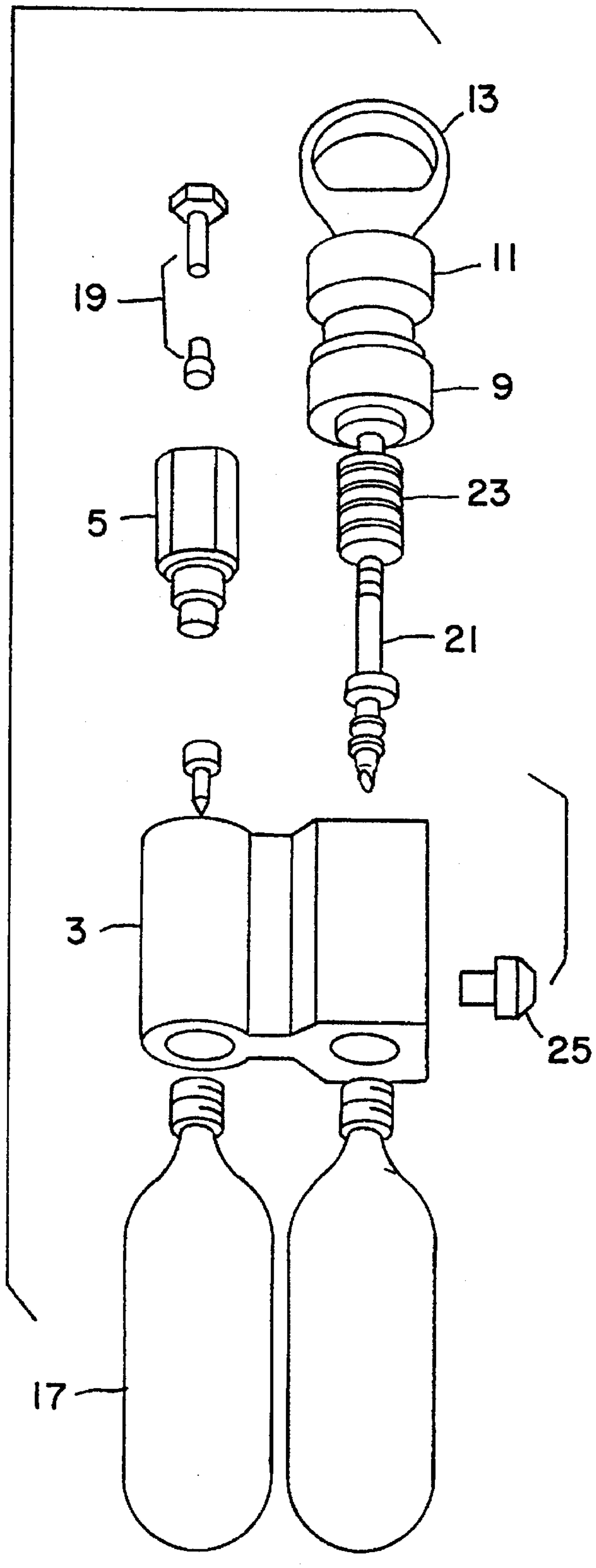
FIG. 2 is an exploded view of the device shown in FIG. 1, showing the compressed air cartridges.

FIG. 2 shows the disassembled elements of FIG. 1, and in addition the compressed air cartridges 17 and regulator internal parts 19, which are not part of this invention. Plunger 21, its drive spring 23 and manifold pressure indicator 25 are shown in FIG. 2.

Figure 3:
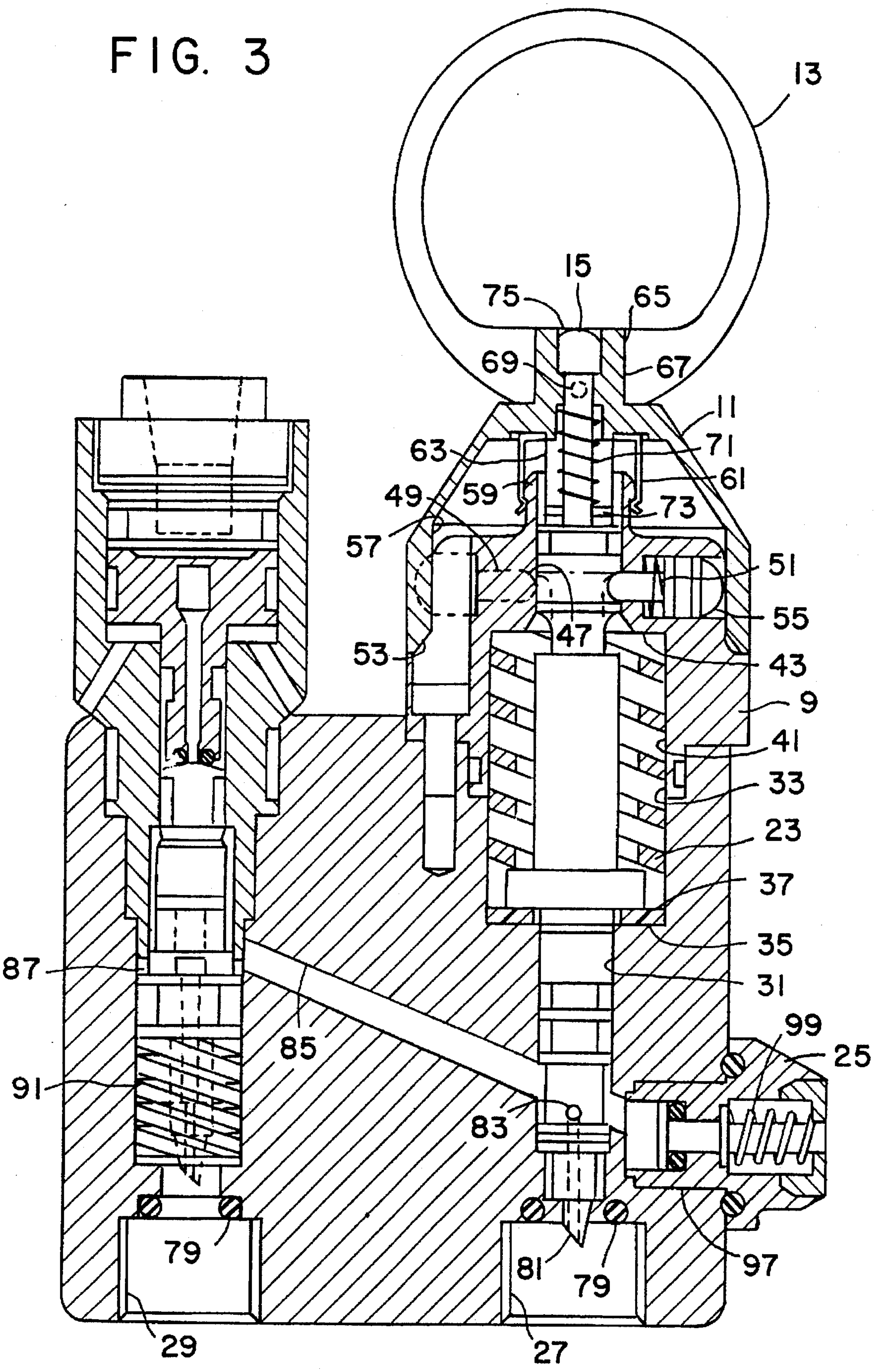
FIG. 3 is a cross-sectional view of the apparatus shown in FIG. 1.

FIG. 3 shows the threaded receivers 27 and 29, which receive the threaded heads of the compressed air cartridges. The plunger 21 slides in a first bore, which extends axially upward from the receiver 27. The first bore has a lower part 31 and an upper part 33. A ledge 35 supports a seal 37. A collar 39 rests on the seal 37 and on ledge 35. The plunger drive spring 23 is held in the bore 33 and in bore 41 of the housing 9. The spring is compressed between the top 43 of the bore 41 and the collar 39 by tightening three bolts 44 which hold the housing on the manifold. The plunger 21 has a recess 45 which receives the semi-spherical inner ends 47 of detent pins 49 when the plunger is moved to its upper position against the force of springs 51. FIG. 3 schematically shows alternative positions of the detents. The detent at right is shown in the position it would assume when the plunger is up to align recess 45 with the detents and when the cap 11 is down to hold the detents inward. The plunger 21, however, is shown in the downward, piercing position.

The bevelled inner surface 53 at the open end of bell-shaped cap 11 slides against the rounded outer surfaces 55 of the detents 49 to move the detents inward, with their inner ends 47 engaging the recess 45 in the plunger. The rounded outer ends 55 remain against the cylindrical inner surface 57 of the cap until the cap is intentionally pulled off by pulling on ring 13. The housing 9 has an upper knob 59, which is gripped by spring fingers 61 of the retainer spring assembly 63, which is connected to the cap 11. The cap 11 has a threaded extension 65, which screws into a threaded opening 67 in the pull ring. Set screw 69 prevents rotation and separation of the pull ring from the cap.

Indicator pin 15 fits in a countersunk bore in the cap extension 65. Spring 71, which is held beneath a ledge in the countersunk bore and a retainer plate 73 fixed to the bottom of pin 15, holds the pin in a downward position with the head of the pin resting against a ledge at the bottom of the upper counterbore 75. When the plunger 21 is in its upper cocked position, the upper end 77 of the plunger pushes pin 15 upward, projecting the head of the pin into the pull ring 13 so that the cocking of the plunger can be assessed by touching.

When the pull ring 13 pulls the cap 11 from the housing 9 the detent pins 49 move outward, releasing the plunger, which is driven downward by spring 23 so that its tapered and bevelled point pierces the compressed air cartridge which is .screwed in to receiver 27 and seated against O-ring 79. The compressed air under high pressure rushes through vertical passage 81 and radial passage 83 and passes through channel 85 into the second bore, where it drives piston 87 downward against the force of light spring 91 to pierce the second cartridge with the tapered and bevelled point 93 of the piston 87. The high pressure compressed air rushes through the axial opening 95 in piston 87, where it joins the air from channel 85 to supply the regulator 5.

The high pressure in the manifold 3 forces pressure indicator pin 97 outward against the force of springs 99 so that the outer end of the pressure indicator pin 97 projects from the indicator 25. As the pressure within the manifold decreases, the springs 99 return the pin inward. A user of the device may, by feeling the pressure indicator 25 and by touching the extension of the pin 97, determine whether substantial pressure remains in the manifold and in the compressed air cartridges. When the pin is retracted, the user understands that only a few breaths of air may remain in the system.

Throughout the system O-rings are used to seal the passageways and to prevent the escape of pressure.

Figure 4:
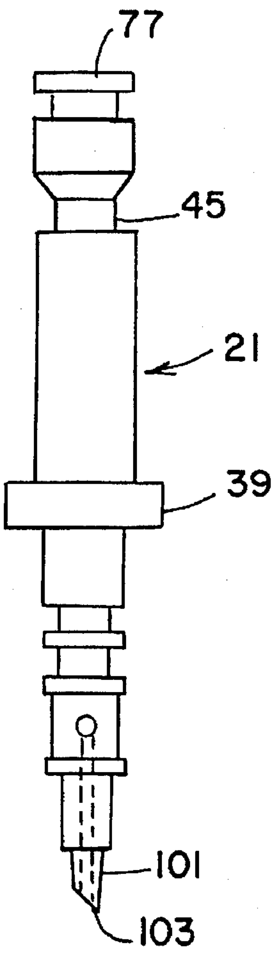
FIG. 4 is an elevation of the primary plunger.
Figure 5:
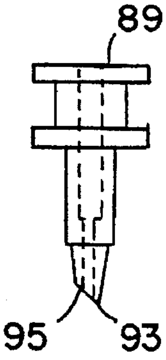
FIG. 5 is an elevation of the secondary piston and cutter.

FIGS. 4 and 5 show the tapered outside 101 of the piercing needles on plunger 21 and piston 87 and its top 89. The tapered outside 101 supports the sharp bevelled point 103 and acts as an additional seal to the opening which the needle forms in the cartridge.

As shown in FIGS. 4 and 5, the plunger 21 and the piston 87 have recesses in the walls which receive O-rings, which are not shown, to aid in the sealing of the passageways and to make sure that compressed air flows only as desired.

The housing 9 is shown in FIG. 6 and 7. Bore 41 supports the plunger drive spring which bears against the top 43 of the bore.

The top of the plunger passes through the bore 105. Three countersunk radial bores 107 receive the three detents 49, as shown in FIG. 3. Three vertically arranged bores 109 receive fasteners which anchor the housing 9 to the manifold 3.

FIG. 8 shows one detent pin 49 with its semi-spherical plunger recess-engaging inner surface 47 and its large semi-spherical outer surface 55 for engaging the inner wall of the cap. The flanges hold an O-ring on the inner section 111.

The cap is shown in FIGS. 9 and 10. Holes 113 receive fasteners which anchor the retainer spring 63 shown in FIG. 3 to the inside of the cap.

Figure 12:
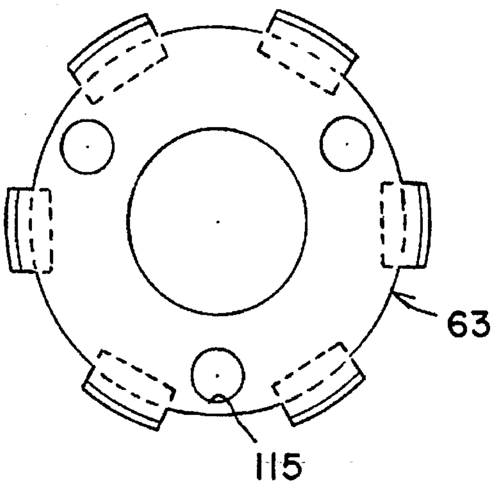
FIG. 12 is a plan view of the cap retainer spring shown in FIG. 11.

The retainer spring 63 and its bent fingers 61 are shown in FIGS. 11 and 12. Holes 115 align with holes 113 in the cap shown in FIG. 10 to receive fasteners which hold the retainer spring to the cap.

Figure 13:
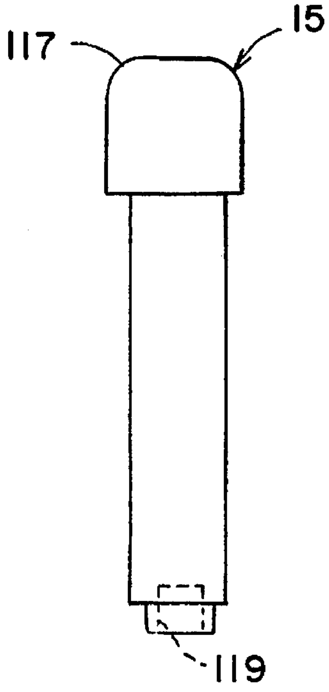
FIG. 13 is a detail of the plunger indicator pin.

The plunger indicator pin 15 is shown in FIG. 13. The upper indicating head 117 projects partially into the ring to indicate that the plunger is in the upper cocked position. A threaded recess 119 in the bottom of the cocking indicator pin anchors the indicator spring retainer.

Figure 14:
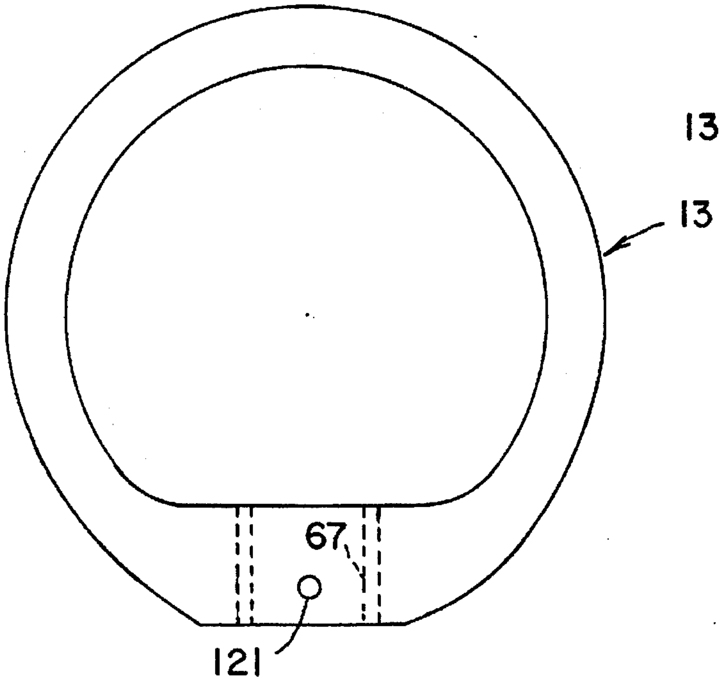
FIG. 14 is a front elevation of the pull ring.
Figure 15:
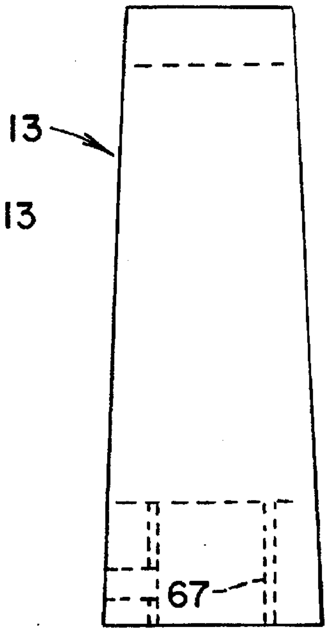
FIG. 15 is a side elevation of the pull ring.

The pull ring 13 is shown in FIGS. 14 and 15. Threaded opening 121 receives the set screw 69 shown in FIG. 3, and the threaded bore 67 receives a threaded upper extension 65 on the cap 11, as shown in FIG. 3.

Figure 16:
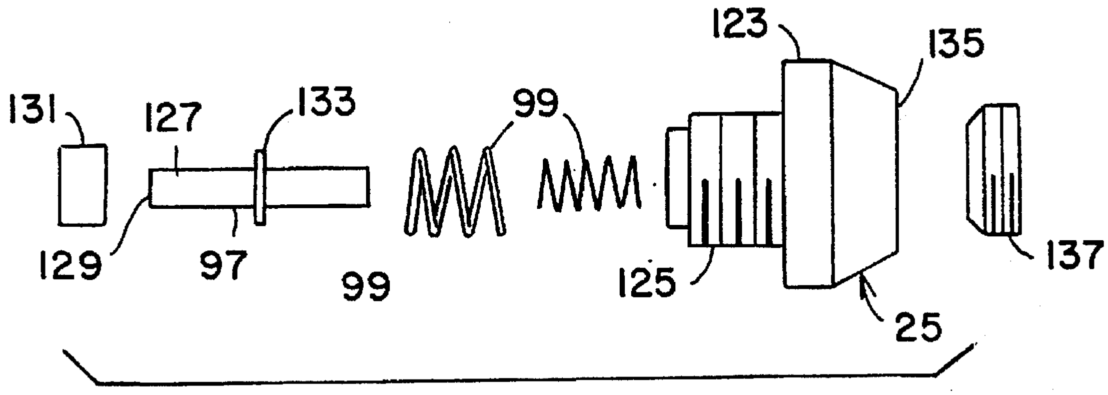
FIG. 16 is an exploded view of parts of the pressure indicator.

The pressure indicator 25 is shown in FIG. 16. The body 123 has a threaded end 125, which secures to a threaded lateral recess in the manifold. Indicator pin 97 has a tapered end 127, so that a small end 129 is presented to the high pressure. A collet 131 fits within a recess in the threaded end of body 125 and compresses an O-ring as shown in FIG. 3 against the base of the counterbore within the threaded extension 125. The pin 97 and springs 99 are inserted in the body 123 through end 135, and the flange 133 on pin 97 rests against a base of a bore in the body 123, as shown in FIG. 3. Springs 99 are compressed by spring holder 137, which is screwed into the threaded opening in the end of the body to compress the springs and urge the pin to the left, non-indicating position, unless sufficient pressure exists in the manifold to drive pin 97 to the right, indicating position.

While the invention has been described with reference to specific embodiments, modifications and variations of the invention may be constructed without departing from the scope of the invention, which is defined in the following claims.

We claim:

1. A pressure indicator which comprises:

a body having a hollow interior and comprising a pressure opening and an open end each extending into the hollow interior, the body adapted to be mounted to a manifold with the pressure opening in fluid communication with a source of pressurized fluid in the manifold, the body comprising an inward counter bore;

a pressure pin having first and second ends, the pressure pin being slidable in the hollow interior of the body, the first end of the pressure pin being subject to the pressurized fluid in the manifold, the pressurized fluid causing the pressure pin to slide in the hollow interior so as to project the second end of the pressure pin outward through the open end of the body;

spring means mounted in the hollow interior for being compressed by outward movement of the pressure pin in the body and for applying an inward force on the pressure pin opposite to the force of the pressurized fluid on the pressure pin, whereby the extension of the second end of the pressure pin from the body provides an indication of the pressure of the pressurized fluid;

means for mounting the spring means in the hollow interior so as to be compressed by the pressure pin during outward movement of the pressure pin; and a collet and o-ring on the pressure pin in the counter bore for preventing the flow of pressurized fluid through the hollow interior of the body.

2. The pressure indicator according to claim 1 wherein the mounting means comprises a flange, the spring means being mounted between the flange and the body.

3. The pressure indicator according to claim 2 wherein the body comprises a spring holder mounted in the open end of the body, the spring means being mounted between the flange and the spring holder.

4. The pressure indicator according to claim 3 wherein the spring, holder is annular and has an opening extending therethrough, the second end of the pressure pin extending through the opening in the spring holder.

5. The pressure indicator according to claim 4 wherein the open end of the body and the spring holder are threaded, the spring holder being threadably inserted in the open end of the body.

6. The pressure indicator according to claim 2 wherein the counter bore comprises a first surface, the collet and o-ring sealing against the first surface of the counter bore, the flange abutting against a first surface of the hollow interior to restrict inward travel of the pressure pin.

7. The pressure indicator according to claim 1 wherein the hollow interior of the body is generally cylindrical.

8. A pressure indicator in combination with a manifold, the manifold having pressurized fluid therein, the pressure indicator comprising:

a body having a hollow interior and comprising a pressure opening and an open end each extending into the hollow interior of the body, the body mounted to the manifold with the pressure opening in fluid communication with the pressurized fluid in the manifold, the body comprising an inward counter bore;

a pressure pin having first and second ends, the pressure pin being slidable in the hollow interior of the body, the first end of the pressure pin being subject to the pressurized fluid in the manifold, the pressurized fluid causing the pressure pin to slide in the hollow interior so as to project the second end of the pressure pin outward through the open end of the body;

spring means mounted in the hollow interior for being compressed by outward movement of the pressure pin in the body and for applying an inward force on the pressure pin opposite to the force of the pressurized fluid on the pressure pin, whereby the extension of the second end of the pressure pin from the body provides an indication of the pressure of the pressurized fluid;

means for mounting the spring means in the hollow interior so as to be compressed by the pressure pin during outward movement of the pressure pin; and a collet and o-ring on the pressure pin in the counter bore for preventing the flow of pressurized fluid through the hollow interior of the body.

9. The apparatus according to claim 8 wherein the mounting means comprises a flange, the spring means being mounted between the flange and the body.

10. The pressure indicator according to claim 9 wherein the body, comprises a spring holder mounted in the open end of the body, the spring means being mounted between the flange and the spring holder.

11. The apparatus according to claim 10 wherein the spring holder is annular and has an opening extending therethrough, the second end of the pressure pin extending through the opening in the spring holder.

12. The apparatus according to claim 1 wherein the open end of the body and the spring holder are threaded, the spring holder being threadably inserted in the open end of the body.

13. The pressure indicator according to claim 9 wherein the counter bore comprises a first surface, the collet and o-ring sealing against the first surface of the counter bore, the flange abutting against a first surface of the interior to restrict inward travel of the pressure pin.

14. The apparatus according to claim 8 wherein the hollow interior of the body is generally cylindrical.

15. The apparatus according to claim 8 wherein the air pressure indicator is threadably inserted into the manifold.

16. The apparatus according to claim 8 wherein the manifold is an underwater breathing apparatus.

* * * * *

UNITED STATES PATENT AND TRADEMARK OFFICE

CERTIFICATE OF CORRECTION

PATENT NO. : 5,653,191

DATED : August 5, 1997

INVENTOR(S) : Clifford A. Calhoun et al.

It is certified that error appears in the above-indentified patent and that said Letters Patent is hereby corrected as shown below:

Column 6, Line 38 Delete: "spring," Insert: --spring--

Column 7, Line 18 Delete: "body," Insert: --body--

Column 8, Line 5 Delete: "1" Insert: --11--

Column 8, Line 12 Delete: "the interior" Insert: --the hollow interior--

Signed and Sealed this

Eleventh Day of November, 1997

*Attest:*

BRUCE LEHMAN

*Attesting Officer*

*Commissioner of Patents and Trademarks*